July 13, 1943.                A. BOOR ET AL                2,324,058
                      HYDRAULIC SHOCK ABSORBER STRUCTURE
                           Filed Dec. 1, 1941
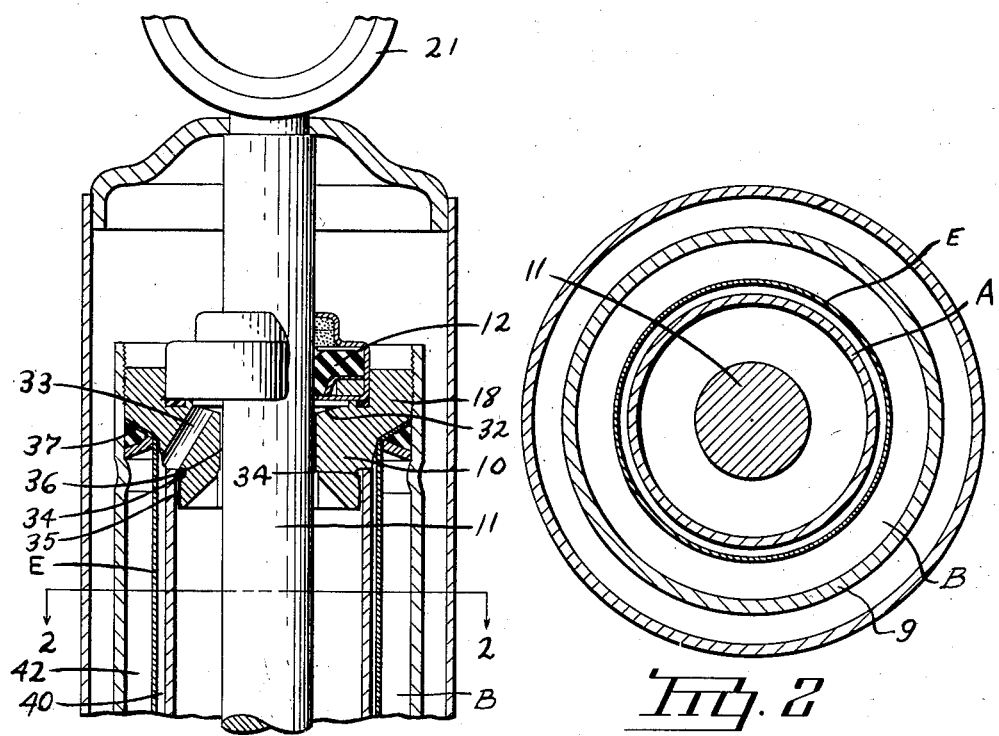
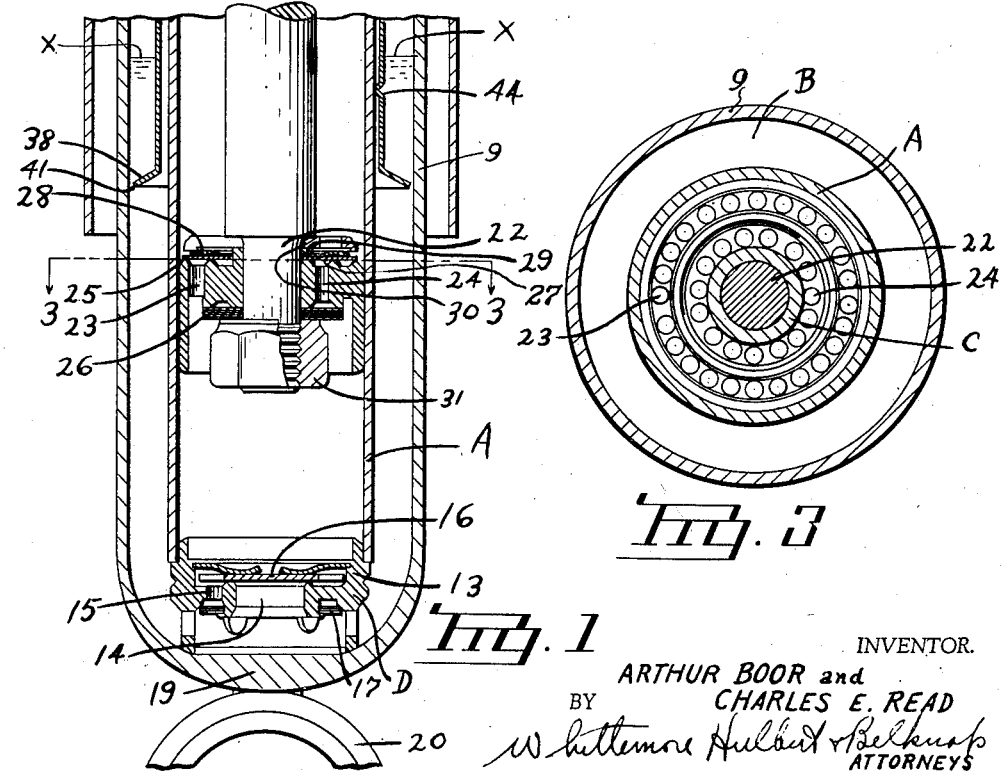
INVENTOR.
ARTHUR BOOR and
CHARLES E. READ
BY
ATTORNEYS Patented July 13, 1943

2,324,058

UNITED STATES PATENT OFFICE 2,324,058

HYDRAULIC SHOCK ABSORBER STRUCTURE

Arthur Boor, Toledo, Ohio, and Charles E. Read, Monroe, Mich., assignor to Monroe Auto Equipment Company, Monroe, Mich., a corporation of Michigan Application December 1, 1941, Serial No. 421,230

7 Claims. (Cl. 188—88)

This invention relates generally to shock absorbers and refers more particularly to hydraulic shock absorbers of the direct-acting type.

One of the essential objects of the invention is to provide a hydraulic shock absorber containing means for segregating the hydraulic medium and air therein so that the latter will not interfere with or impede the action of the hydraulic medium during the operation of the shock absorber.

Another object is to relieve the pressure cylinder of objectionable air and to trap it in the reserve chamber so that such air will not be apt to find its way back to the pressure cylinder. Thus, the compression of air bubbles by the piston in the pressure cylinder will practically be eliminated.

Other objects, advantages and novel details of construction of this invention will be made more apparent as this description proceeds, especially when considered in connection with the accompanying drawing, wherein:

Figure 1 is a longitudinal vertical sectional view through a shock absorber structure embodying our invention;

Figure 2 is a cross sectional view taken substantially on the line 2—2 of Figure 1;

Figure 3 is a cross sectional view taken substantially on the line 3—3 of Figure 1.

Referring to the drawing, A is the pressure cylinder, B is the reserve chamber, and C is the piston of a hydraulic shock absorber containing the means aforesaid embodying our invention.

As shown, the pressure cylinder A has a closure 10 at its upper end sleeved on a rod 11 for the piston C and has a base compression valve assembly D at its lower end. The closure 10 carries a suitable seal 12 to prevent leakage of the hydraulic medium along the rod 11 to the exterior of the shock absorber, while the base compression valve assembly D has a body 13 rigid with the cylinder A and provided with a relatively large central opening 14 and a series of smaller openings 15 substantially concentric with the central opening, a spring-pressed disc valve 16 controlling the central opening, and a laminated spring valve 17 controlling the smaller openings.

A casing member 9 is substantially concentric with the pressure cylinder A and is mounted on an annular enlargement 18 of the closure 10. Such casing member 9 cooperates with cylinder A to form the reservoir chamber B. The lower end 19 of the casing member 9 is closed and is rigid with a suitable head 20 for attachment to the unsprung weight of a vehicle. A similar head 21 is rigid with the outer end of the piston rod 11 and is adapted to be attached to the sprung weight of the vehicle.

The piston C is mounted on a reduced end portion 22 of the rod 11 and slidably engages the inner walls of the pressure cylinder A. Preferably the piston has two series of openings 23 and 24, respectively, therethrough controlled by valves 25 and 26, respectively. Preferably the valve 25 is on top of the piston and comprises a disc normally closing the upper ends of the openings 23 and having a curved slot 27 registering with the upper ends of the openings 24, while the valve 26 is on the underside of the piston and comprises a laminated spring normally closing the lower ends of the openings 24. A star-shaped leaf spring 28 is employed to hold the disc valve 25 in closed position. Any suitable means such as the washers 29 and 30, respectively, and nut 31 on the reduced end portion 22 of the piston rod may be used to hold the piston C, valves 25, 26, and spring 28 in proper assembled relation.

In the present instance, the closure 10 is provided just below the seal 12 with an annular pocket 32 for receiving the hydraulic medium scraped off the rod 11 by the seal 12, and has an inclined passage 33 for conducting such hydraulic medium from the pocket 32 over the upper end of the pressure cylinder A to the reserve chamber B. Such closure is also provided at the juncture of the inclined passage 33 and the upper end of the pressure cylinder A with an annular groove or channel 34, and has a restricted passage 35 for air extending from the interior of the pressure cylinder A to said groove. Some slight clearance 36 may also be provided between the closure 10 and piston rod 11 from the interior of the pressure cylinder A to the pocket 32.

Located within the reserve chamber B at the upper end thereof in substantially concentric relation to the pressure cylinder A is a tube E having a flanged upper end 37 anchored upon the closure 10 just above the lower end of the inclined passage 33 and having a flared lower end 38. Preferably the tube E is relatively close to the pressure cylinder A so that a somewhat restricted annular space 40 is provided therebetween at the discharge end of the inclined passage 33. The outer edge 41 of the flared lower end of this tube is relatively close to the inner cylindrical surface of casing member 9 so as to provide above said flared end a relatively large annular air trapping space 42. Any suitable means such as the embossed portions 44 may be used to hold the tube E in proper spaced relation to the pressure cylinder A and casing member 9.

Normally the level of the hydraulic medium in the shock absorber is approximately at the mark X in Figure 1 which is above the flared lower end 38 of the tube E. Thus, the space 42 constitutes a pocket or trap for air at the upper end of the chamber B above the level X mentioned.

In use, when the heads 20 and 21 move toward each other, the piston C will be on its compression stroke and accordingly will cause the hydraulic medium to flow through the passages 23 in the piston past the disc valve 25 to the space in the cylinder A above the piston, and will also cause the hydraulic medium to flow through the passages 15 in the base compression valve assembly D past the laminated spring valve 17 to the reserve chamber B. When the heads 20 and 21 move away from each other, the piston C will be on its rebound stroke and will cause the hydraulic medium to flow through the central opening 14 in the compression valve assembly D past the disc valve 16 into the cylinder A below the piston C, and will cause the hydraulic medium to flow through the passages 24 in the piston past the laminated spring valve 26 into the space in the cylinder A below the piston. Thus, the piston valves 25 and 26 will meter the flow of the hydraulic medium and will provide the shock absorber resistance on both compression and rebound. Compression resistance is determined by the summation of the resistance provided by the piston valve 25 and the base compression valve 17, while rebound resistance is dependent upon the piston valve 26.

During relative movement of the piston C and cylinder A as aforesaid, a certain amount of air will pass through the restricted passage 35, groove 34 and passage 33 to the space 40 between the tube E and cylinder A and thence beneath the flared end 38 of the tube to the space 42 between the tube E and reserve chamber B where it will be trapped, while some of the hydraulic medium in the cylinder A will escape through the clearance 36 provided between the piston rod 11 and closure 10 into the pocket 32 of the latter and will flow from said pocket through the inclined passage 33 to the space 40 between the tube E and cylinder A where it will join the other hydraulic medium in the reserve chamber B. Thus, on the rebound stroke of the piston the air is cleared out first, then the hydraulic medium flows down in the space 40 to join the other hydraulic medium in the reserve chamber. Consequently, the tube E including the flared lower end 38 thereof will serve as a baffle to effectively prevent the hydraulic medium from discharging into the air space 42 at the upper end of the reserve chamber. Moreover, on the compression stroke of the piston, the tube E will prevent air instead of hydraulic medium from being drawn from said air space 42 through either the passage 35 or clearance 36 into the pressure cylinder A. Actually the tube E segregates the hydraulic medium and air in the reserve chamber B and cooperates with said chamber to collect and trap the air so that it will not impede or interfere with the hydraulic medium during operation of the shock absorber.

What we claim as our invention is:

1. In a hydraulic shock absorber having relatively movable parts, one being a pressure cylinder and the other a piston in said cylinder, an operating rod for the piston, a closure for the upper end of said cylinder sleeved on said rod, and a casing member carried by said closure in substantially concentric relation to the cylinder and cooperating therewith to form a reserve chamber; a tubular partition member within the reserve chamber between and in substantially concentric relation to the cylinder and casing member, said partition member being closer to the cylinder than to the casing member whereby a restricted annular space is provided between the partition member and cylinder and a relatively large annular space is provided between the partition member and casing member, said partition member being suspended from the closure and having its lower end below the normal level of hydraulic medium in the reserve chamber, the restricted annular space aforesaid being in communication with the pressure cylinder to receive hydraulic medium and air therefrom and being in open communication with the lower portion of the reserve chamber, the large annular space aforesaid being closed except at its lower end to provide a trap for air, and a baffle element located between the partition member and casing member at the lower end of the large annular space, said baffle element cooperating with the casing member to provide a restricted inlet for air to said air trap and cooperating with the partition member to exclude as far as possible hydraulic medium from said air trap.

2. In a hydraulic shock absorber having relatively movable parts, one being a pressure cylinder and the other a piston in said cylinder, an operating rod for the piston, a closure for the upper end of said cylinder sleeved on said rod, and a casing member carried by said closure in substantially concentric relation to the cylinder and cooperating therewith to form a reserve chamber; a tubular partition member within the reserve chamber between and in substantially concentric relation to the cylinder and casing member, said partition member cooperating with the cylinder to provide one annular space and cooperating with the casing member to provide a second annular space, said partition member being connected to the closure and having its lower end below the normal level of hydraulic medium in the reserve chamber, the first mentioned annular space being in communication with the pressure cylinder to receive hydraulic medium and air therefrom and being in open communication with the lower portion of the reserve chamber, the second mentioned annular space being closed except at its lower end to provide a trap for air, and means at the lower end of the second mentioned annular space cooperating with the casing member to provide a restricted inlet for air to said air trap and cooperating with the partition member to exclude as far as possible hydraulic medium from said air trap.

3. In a hydraulic shock absorber having relatively movable parts, one being a pressure cylinder and the other a piston in said cylinder, an operating rod for the piston, a closure for the upper end of said cylinder sleeved on said rod, and a casing member carried by said closure in substantially concentric relation to the cylinder and cooperating therewith to form a reserve chamber; a tubular partition member within the reserve chamber between and in substantially concentric relation to the cylinder and casing member, said partition member cooperating with the cylinder to provide one annular space and cooperating with the casing member to provide a second annular space, said partition member being suspended from the closure and having its lower end below the normal level of hydraulic medium in the reserve chamber, the first mentioned annular space being in communication with the pressure cylinder to receive hydraulic medium and air therefrom and being in open communication with the lower portion of the reserve chamber, the second mentioned annular space being closed except at its lower end to provide a trap for air, and a baffle at the lower end of the second mentioned annular space cooperating with the casing member to provide an inlet for air to said air trap and cooperating with the partition member and casing member to exclude as far as possible hydraulic medium from said air trap.

4. In a hydraulic shock absorber having relatively movable parts, one being a pressure cylinder and the other a piston in said cylinder, an operating rod for the piston, a closure for the upper end of said cylinder sleeved on said rod, and a casing member carried by said closure in substantially concentric relation to the cylinder and cooperating therewith to form a reserve chamber; a tubular partition member within the reserve chamber between and in substantially concentric relation to the cylinder and casing member, said partition member cooperating with the cylinder to provide one annular space and cooperating with the casing member to provide a second annular space, said partition member being suspended from the closure, the first mentioned annular space being in communication with the pressure cylinder to receive hydraulic medium and air therefrom and being in open communication with the lower portion of the reserve chamber, the second mentioned annular space being closed except at its lower end to provide a trap for air, and a lateral flange on the partition member at the lower end of the second mentioned annular space cooperating with the casing member to provide an inlet for air to said air trap and cooperating with the partition member to exclude as far as possible hydraulic medium from said air trap.

5. In a hydraulic shock absorber having relatively movable parts, one being a pressure cylinder and the other a piston in said cylinder, an operating rod for the piston, a closure for the upper end of said cylinder sleeved on said rod, and a casing member carried by said closure in substantially concentric relation to the cylinder and cooperating therewith to form a reserve chamber; a tubular partition member within the reserve chamber between and in substantially concentric relation to the cylinder and casing member, said partition member cooperating with the cylinder to provide one annular space and cooperating with the casing member to provide a second annular space, said partition member being suspended from the closure and having its lower end below the normal level of hydraulic medium in the reserve chamber, the closure having means for conducting hydraulic medium and air from the pressure cylinder to the first mentioned annular space, the lower end of said first mentioned annular space being in open communication with the lower portion of the reserve chamber to permit free discharge of hydraulic medium and air from said first mentioned annular space to the lower portion of the reserve chamber, the second mentioned annular space being closed except at its lower end to provide a trap for air, and means at the lower end of the second mentioned annular space cooperating with the casing member to provide a restricted inlet for air to said air trap and cooperating with the partition member to exclude as far as possible hydraulic medium from said air trap.

6. In a hydraulic shock absorber having relatively movable parts, one being a pressure cylinder and the other a piston in said cylinder, an operating rod for the piston, a closure for the upper end of said cylinder sleeved on said rod, and a casing member carried by said closure in substantially concentric relation to the cylinder and cooperating therewith to form a reserve chamber; a tubular partition member within the reserve chamber between and in substantially concentric relation to the cylinder and casing member, said partition member cooperating with the cylinder to provide one annular space and cooperating with the casing member to provide a second annular space, said partition member being suspended from the closure and having its lower end below the normal level of hydraulic medium in the reserve chamber, the closure having means for conducting hydraulic medium and air from the pressure cylinder to the first mentioned annular space, the lower end of said first mentioned annular space being in open communication with the lower portion of the reserve chamber to permit free discharge of hydraulic medium and air from said first mentioned annular space to the lower portion of the reserve chamber, and a lateral flange at the lower end of the partition member cooperating with the casing member to provide a restricted inlet for air to said air trap and cooperating with the partition member to exclude as far as possible hydraulic medium from said air trap.

7. In a hydraulic shock absorber having relatively movable parts, one being a pressure cylinder and the other a piston in said cylinder, an operating rod for the piston, a closure for the upper end of said cylinder sleeved on said rod, and a casing member carried by said closure in substantially concentric relation to the cylinder and cooperating therewith to form a reserve chamber; a tubular partition member within the reserve chamber between and in substantially concentric relation to the cylinder and casing member, said partition member cooperating with the cylinder to provide one annular space and cooperating with the casing member to provide a second annular space, said partition member being connected to the closure and having its lower end below the normal level of hydraulic medium in the reserve chamber, the first mentioned annular space being in communication with the pressure cylinder to receive hydraulic medium and air therefrom and being in open communication with the lower portion of the reserve chamber, the second mentioned annular space being closed except at its lower end to provide a trap for air, and means carried by the partition member at the lower end of the second mentioned annular space extending toward and cooperating with the casing member to provide a restricted inlet for air to said air trap, the partition member and means at the lower end thereof collectively forming a baffle to exclude as far as possible hydraulic medium from said air trap.

ARTHUR BOOR.
CHARLES E. READ.